United States Patent
Jennings et al.

(10) Patent No.: US 8,363,320 B2
(45) Date of Patent: Jan. 29, 2013

(54) METHOD AND APPARATUS FOR DECORRELATION OF SPATIALLY AND TEMPORALLY COHERENT LIGHT

(75) Inventors: Dean Jennings, Beverly, MA (US); Timothy N. Thomas, Portland, OR (US); Stephen Moffatt, Channel Islands (GB); Jiping Li, Palo Alto, CA (US); Bruce E. Adams, Portland, OR (US); Samuel C. Howells, Portland, OR (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 13/095,758

(22) Filed: Apr. 27, 2011

(65) Prior Publication Data

US 2011/0199683 A1 Aug. 18, 2011

Related U.S. Application Data

(62) Division of application No. 11/831,838, filed on Jul. 31, 2007.

(51) Int. Cl.
*G02B 5/30* (2006.01)
(52) U.S. Cl. .................................. 359/489.07
(58) Field of Classification Search .................. None
See application file for complete search history.

(56) References Cited

U.S. PATENT DOCUMENTS

| | | | |
|---|---|---|---|
| 6,191,887 B1 * | 2/2001 | Michaloski et al. | 359/489.09 |
| 6,376,806 B2 | 4/2002 | Yoo | |
| 6,574,015 B1 | 6/2003 | Tselikov et al. | |
| 6,608,847 B2 * | 8/2003 | Zhang et al. | 372/20 |
| 6,956,878 B1 | 10/2005 | Trisnadi | |
| 7,221,444 B1 | 5/2007 | Zhao | |
| 7,242,480 B2 * | 7/2007 | Alphonse | 356/479 |
| 8,148,663 B2 | 4/2012 | Adams et al. | |
| 2002/0114032 A1 | 8/2002 | Salzman | |
| 2009/0034071 A1 | 2/2009 | Jennings et al. | |

FOREIGN PATENT DOCUMENTS

WO WO 2006058754 A2 * 6/2006

OTHER PUBLICATIONS

Definition of "retroreflector", Merriam-Webster Dictionary, <http://merriam-webster.com/dictionary/retroreflector>, Retrieved Feb. 15, 2012.*
PCT International Seach Report dated Sep. 5, 2008.
Melles Griot, "Beamsplitters: A Guide for Designers," The Photonics Design and Applications Handbook, 2002.

* cited by examiner

*Primary Examiner* — Derek S Chapel
(74) *Attorney, Agent, or Firm* — Patterson & Sheridan, LLP

(57) ABSTRACT

A method and apparatus for decorrelating coherent light from a light source, such as a pulsed laser, in both time and space in an effort to provide intense and uniform illumination are provided. The techniques and apparatus described herein may be incorporated into any application where intense, uniform illumination is desired, such as pulsed laser annealing, welding, ablating, and wafer stepper illuminating.

20 Claims, 3 Drawing Sheets

METHOD AND APPARATUS FOR DECORRELATION OF SPATIALLY AND TEMPORALLY COHERENT LIGHT

CROSS-REFERENCE TO RELATED APPLICATIONS

This application is a divisional of co-pending U.S. patent application Ser. No. 11/831,838, filed Jul. 31, 2007. This application is related to U.S. patent application Ser. No. 11/831,830, entitled "Method for Partitioning and Incoherently Summing a Coherent Beam," by Dean Jennings et al., filed Jul. 31, 2007; and U.S. patent application Ser. No. 11/888,433 entitled "Apparatus and Method of Improving Beam Shaping and Beam Homogenization," by Bruce E. Adams et al., filed Jul. 31, 2007; which are all herein incorporated by reference.

BACKGROUND OF THE INVENTION

1. Field of the Invention

Embodiments of the present invention generally relate to coherent light sources such as lasers and, more particularly, to temporally and spatially decorrelating coherent light in an effort to provide intense and uniform illumination.

2. Description of the Related Art

The integrated circuit (IC) market is continually demanding greater memory capacity, faster switching speeds, and smaller feature sizes. One of the major steps the industry has taken to address these demands is to change from batch processing silicon wafers in large furnaces to single wafer processing in a small chamber.

During such single wafer processing the wafer is typically heated to high temperatures so that various chemical and physical reactions can take place in multiple IC devices defined in the wafer. Of particular interest, favorable electrical performance of the IC devices requires implanted regions to be annealed. Annealing recreates a more crystalline structure from regions of the wafer that were previously made amorphous, and activates dopants by incorporating their atoms into the crystalline lattice of the substrate, or wafer. Thermal processes, such as annealing, require providing a relatively large amount of thermal energy to the wafer in a short amount of time, and thereafter rapidly cooling the wafer to terminate the thermal process. Examples of thermal processes currently in use include Rapid Thermal Processing (RTP) and impulse (spike) annealing.

A drawback of RTP processes is that they heat the entire wafer even though the IC devices typically reside only in the top few microns of the silicon wafer. This limits how fast one can heat up and cool down the wafer. Moreover, once the entire wafer is at an elevated temperature, heat can only dissipate into the surrounding space or structures. As a result, today's state of the art RTP systems struggle to achieve a 400° C./s ramp-up rate and a 150° C./s ramp-down rate. While RTP and spike annealing processes are widely used, current technology is not ideal, and tends to ramp the wafer temperature during thermal processing too slowly and thus expose the wafer to elevated temperatures for too long a period of time. These thermal budget type problems become more severe with increasing wafer sizes, increasing switching speeds, and/or decreasing feature sizes.

To resolve some of the problems raised in conventional RTP type processes various scanning laser anneal techniques have been used to anneal the surface(s) of the substrate. In general, these techniques deliver a constant energy flux to a small region on the surface of the substrate while the substrate is translated, or scanned, relative to the energy delivered to the small region. Due to the stringent uniformity requirements and the complexity of minimizing the overlap of scanned regions across the substrate surface these types of processes are not effective for thermal processing contact level devices formed on the surface of the substrate.

Pulsed laser annealing techniques have been used to anneal finite regions on the surface of the substrate to provide well defined annealed and/or re-melted regions on the surface of the substrate. In general, during a pulsed laser anneal process various regions on the surface of the substrate are exposed to a desired amount of energy delivered from the laser to cause the preferential heating of desired regions of the substrate. Pulsed laser annealing techniques have an advantage over conventional processes that sweep the laser energy across the surface of the substrate, since the need to tightly control the overlap between adjacently scanned regions to assure uniform annealing across the desired regions of the substrate is not an issue, since the overlap of the exposed regions of the substrate is typically limited to the unused space between die, or "kerf" lines.

However, light waves produced by a laser often have high temporal and spatial coherence. Coherence is the property of waves that enables them to exhibit interference where at least two waves are combined to add constructively or subtract destructively depending on the relative phase between the waves. Temporal coherence characterizes how well a wave can interfere with itself at a different time and may be defined as the measure of the average correlation between the value of a wave at every pair of times separated by a given delay. Thus, a wave containing only a single frequency (a perfect sine wave or monochromatic light) is perfectly correlated at all times, while a wave whose phase drifts quickly will have a short coherence time. The most monochromatic sources are usually lasers, and higher quality lasers tend to have long correlation lengths (up to hundreds of meters). White light, which comprises a broad range of frequencies, is a wave which varies quickly in both amplitude and phase leading to a short coherence time (approximately 10 periods); thus, white light is usually considered as incoherent. Spatial coherence describes the ability for two points in the extent of a wave to interfere when averaged over time. More precisely, spatial coherence may be defined as the cross-correlation between two points in a wave for all times.

The coherence of laser beams manifests itself as speckle patterns and diffraction fringes, which suggest deviation from the desired uniform illumination in pulsed laser annealing and other applications. A speckle pattern is a random intensity pattern produced by the mutual interference of coherent waves that are subject to phase differences and/or intensity fluctuations. Because the surfaces of most materials are extremely rough on the scale of an optical wavelength (~500 nm), coherent light from a laser, for example, reflected from such a surface results in many coherent wavelets, each arising from a different microscopic element of the surface. At any moderately distant point from the surface, the distances traveled by these various wavelets may differ by several wavelengths, and the interference of these wavelets of various phases results in the granular pattern of intensity called speckle. In other words, each point in the speckle pattern is a superposition of each point of the rough surface contributing with a random phase due to path length differences. Diffraction fringes are formed when light from a point source, such as a laser, passes by an opaque object of any shape.

Spatial coherence of light sources has been addressed by the use of random phase plates, also known as diffusers. Intended to scatter the light, optical diffusers increase the frequency of modulation due to interference, but they do not eliminate the interference. However, for pulsed laser annealing techniques and other applications, it is not sufficient to simply increase the frequency of modulation with a diffuser; the depth of modulation from coherence effects should be reduced, as well.

Accordingly, what are needed are techniques and apparatus for temporally and spatially decorrelating light from a coherent light source to provide incoherent light.

SUMMARY OF THE INVENTION

Embodiments of the present invention generally relate to decorrelating coherent light from a light source, such as a pulsed laser, in both time and space in an effort to provide intense and uniform illumination.

One embodiment of the present invention is a method for decorrelating a coherent light beam. The method generally includes circularly polarizing the coherent light beam; transmitting the circularly polarized light beam through a plurality of optically coupled glass plates; reflecting the transmitted circularly polarized light beam for transmission back through the plurality of glass plates, wherein each of the glass plates reflects a portion of the transmitted circularly polarized light beam and reflects a portion of the reflected circularly polarized light beam such that a plurality of component beams are created, separated in both time and space from each other; and linearly polarizing the reflected circularly polarized light beam.

Another embodiment of the present invention is a method for decorrelating a coherent light beam. The method generally includes dividing the coherent light beam into a plurality of component beams, separating the plurality of component beams in both space and time, and recombining at least a portion of the separated component beams to form an incoherent light beam.

Yet another embodiment of the present invention provides an apparatus for decorrelating coherent light. The apparatus generally includes a polarizing beam splitter configured to receive the coherent light, a wave plate coupled to the polarizing beam splitter, a plurality of optically coupled glass plates, the plurality having a first end and a second end wherein the first end is optically coupled to the wave plate, and a reflecting device optically coupled to the second end of the plurality of glass plates.

Yet another embodiment of the present invention provides a laser processing system. The laser processing system generally includes a laser source for providing coherent light, a decorrelator coupled to the laser source, and a target coupled to the decorrelator, wherein the target receives incoherent light. The decorrelator generally includes a polarizing beam splitter configured to receive the coherent light, a wave plate coupled to the polarizing beam splitter, a plurality of optically coupled glass plates, the plurality having a first end and a second end wherein the first end is optically coupled to the wave plate, and a reflecting device optically coupled to the second end of the plurality of glass plates.

Yet another embodiment of the present invention is a method for decorrelating a coherent light beam. The method generally includes positioning a plurality of plates and transmitting a pulse of energy through the plurality of plates to form a composite pulse of energy. Positioning the plurality of plates generally includes positioning a first plate, positioning a first surface of a second plate a first distance from a first surface of the first plate, and positioning a first surface of a third plate a second distance from a second surface of the second plate, wherein the first distance is not equal to the second distance. The composite pulse of energy generally includes an amount of energy transmitted through the first, second, and third plates and an amount of energy comprising energy that has been reflected at least once by each of the first, second, and third plates.

Yet another embodiment of the present invention provides an apparatus for decorrelating coherent light. The apparatus generally includes a wave plate positioned to receive energy delivered from a coherent light source and a plurality of glass plates that are each positioned to receive at least a portion of energy transmitted through the wave plate from the coherent light source in sequence. The plurality of glass plates generally includes a first plate having a first surface; a second plate having a first surface, wherein the first surface of the first plate is positioned a first distance from the first surface of the second plate; and a third plate having a first surface, wherein the first surface of the third plate is positioned a second distance from a second surface of the second plate and the first distance is not equal to the second distance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention decorrelate temporally and spatially coherent light from a light source in an effort to provide intense and uniform illumination. The methods and apparatus described herein may be incorporated into any application where intense, uniform illumination is desired, such as pulsed laser annealing, welding, ablating, and wafer stepper illuminating.

An Exemplary Laser Processing System

Figure 1:
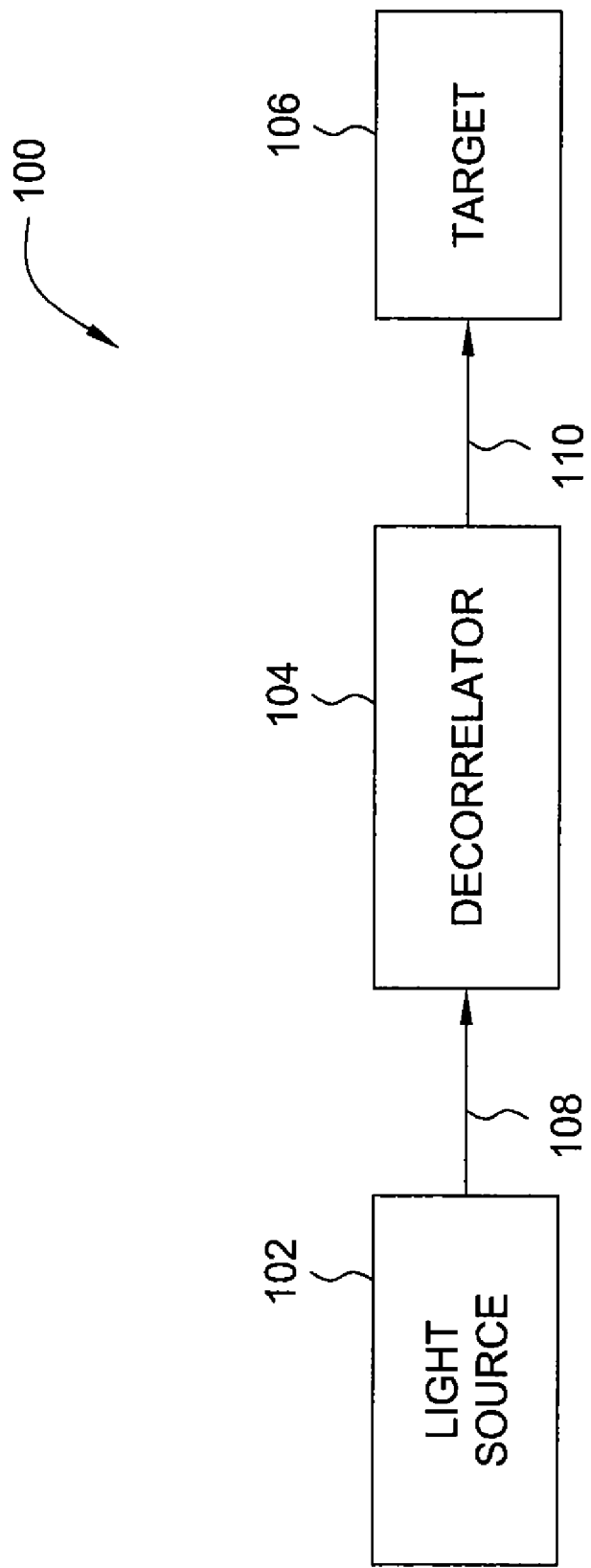
FIG. 1 is a block diagram of a laser processing system incorporating a decorrelator to produce spatially and temporally incoherent light in accordance with an embodiment of the present invention.

For example, in an exemplary laser processing system 100 of FIG. 1, a light source 102, such as a pulsed laser, may be provided for sourcing temporally and spatially coherent light. For some embodiments, the light source 102 may represent a plurality of light sources that have been combined to form a single light beam. Because techniques for combining light from a plurality of sources are known to those skilled in the art and are beyond the scope of the present invention, such techniques will not be described herein.

For a pulsed laser, energy pulse characteristics of the light source 102 may typically include, but are not limited to, the total amount of energy, the energy flux, the energy density, and/or the duration of the pulse. In a pulsed laser annealing application if the energy pulse characteristics are not optimized, damage to a substrate may be created by the stress induced from the rapid heating of the melted regions on the surface of the substrate. The rapid heating may generate acoustic shock waves in the substrate that can cause cracks, induce stress, and otherwise damage various regions of the substrate. It should be noted that energy pulse durations that are too long are also undesirable since this may cause dopants in the anneal regions to undesirably diffuse into adjacent regions of the substrate. Therefore, energy pulse characteristics of the light source 102 for a given application should be heeded.

The light source 102 may be optically coupled to a decorrelator 104 for producing incoherent light in an effort to uniformly illuminate a target 106, such as a substrate undergoing semiconductor processing (e.g., pulsed laser annealing) or two components being welded together. The decorrelator 104 may eliminate certain undesirable effects from the coherent light, such as speckle or fringe formation. Optical coupling between the light source 102 and the decorrelator 104 and between the decorrelator 104 and the target 106 may occur via simple linear alignment of the devices, optical steering devices (e.g., mirrors, lenses, and beam splitters), and/or optical fibers depending on the application. Although not shown in the system 100 of FIG. 1, optional optical conditioning devices (e.g., optical filters) may also be coupled between the light source 102 and the decorrelator 104 and between the decorrelator 104 and the target 106 in an effort to process the coherent light beam 108 before decorrelation or the incoherent light beam 110 before delivery to the target 106.

An Exemplary Coherent Light Decorrelator

Figure 2:
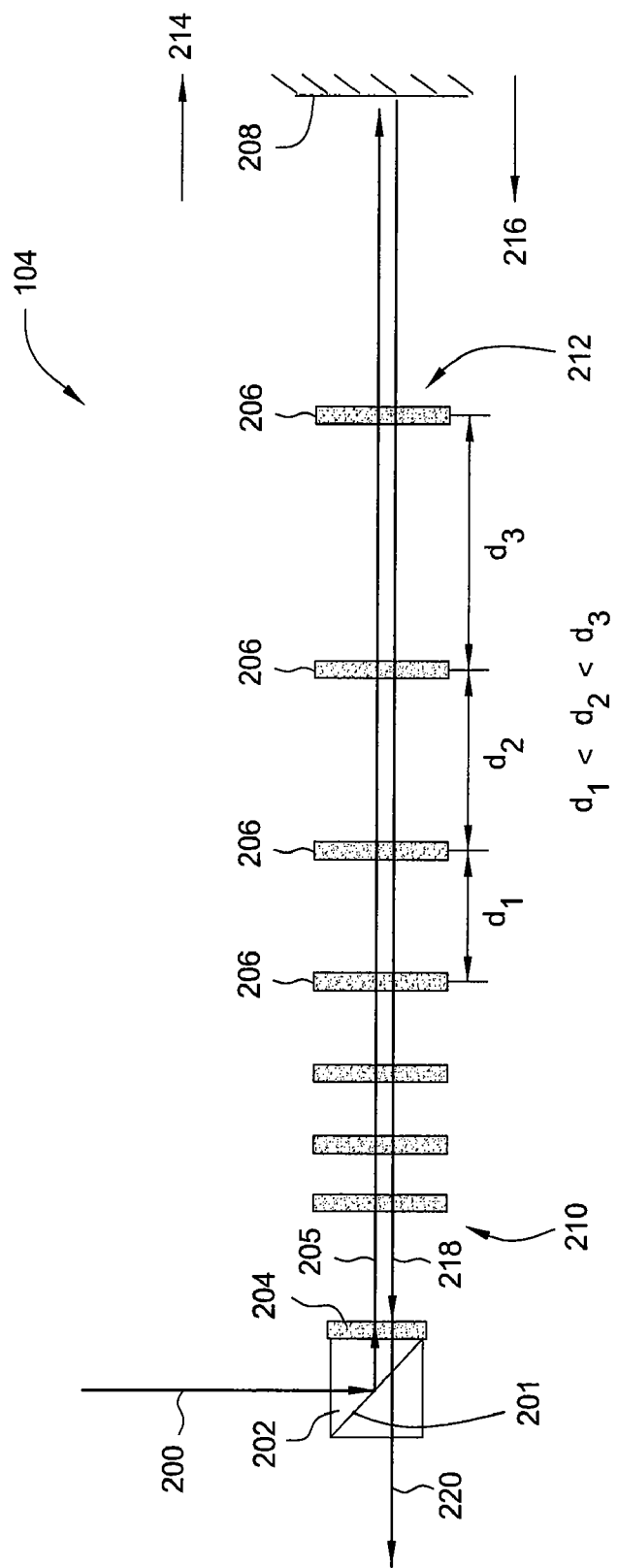
FIG. 2 illustrates an apparatus for decorrelating incident coherent light using a polarizing beam splitter, a wave plate, a plurality of glass plates, and a reflecting device in accordance with an embodiment of the present invention.

One exemplary embodiment of a decorrelator 104 is illustrated in FIG. 2. In this decorrelator 104, incident coherent light 200 may be directed to a polarizing beam splitter (PBS) 202. For some embodiments, the incident light 200 may be s-polarized, or perpendicular to the plane of incidence, a plane made by the propagation direction of the light and a vector normal to a reflecting surface. S-polarization is also known as sigma-polarization or sagittal plane polarization. The PBS 202 may be a cube formed from two triangular glass prisms that are glued together at their bases 201 using Canada balsam, a transparent resin obtained from the balsam fir and used as cement for glass lenses and other optical devices. Upon entering one face of the PBS 202 and reaching the base 201 of one of the two triangular prisms, a portion of the incident light 200 may be reflected and redirected through a wave plate 204 coupled to the PBS 202.

Figure 3:
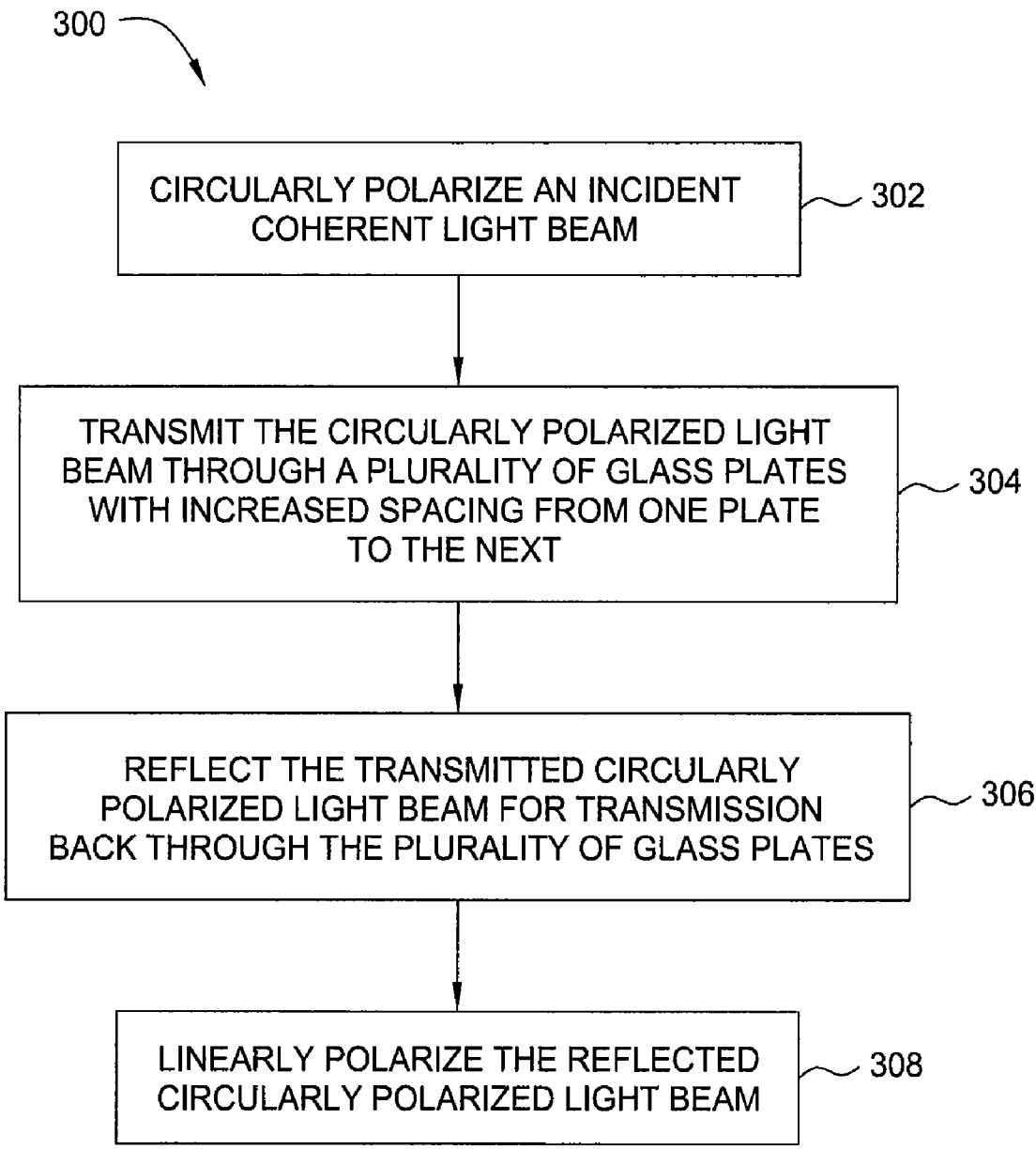
FIG. 3 is a flow diagram for decorrelating incident coherent light in accordance with an embodiment of the present invention.

Also known as a retarder, a retardation plate, or a retardation sheet, the wave plate 204 may alter the polarization state of a light wave traveling through it. A typical wave plate is simply a birefringent crystal with a carefully chosen thickness, and wave plates are characterized by the amount of relative phase that they impart on a light wave by the formula:

$$\Gamma = 2\pi L \Delta n / \lambda$$

where $\Delta n$ is the birefringence of the crystal, L is the thickness of the crystal, and $\lambda$ is the wavelength of the light wave. For some embodiments, the wave plate 204 may be a quarter wave plate. A quarter wave plate creates a quarter wavelength phase shift and can change linearly polarized light to circularly polarized light and vice versa. Therefore, a linearly polarized incident light beam may exit the wave plate 204 as circularized polarized coherent light 205 for such embodiments. This step is illustrated in the flow diagram 300 of FIG. 3 as step 302. A circularly polarized light wave may be resolved into two linearly polarized light waves of equal amplitude, in phase quadrature (i.e., phase shifted 90° apart), and with their planes of polarization at right angles to each other such that the electric field vector, at one point in time, describes a helix along the direction of light wave propagation.

Light exiting the wave plate 204 may be transmitted to a plurality of optically coupled glass plates 206 in step 304. The light exiting the wave plate 204 may be optically coupled to the glass plates 206 via any suitable techniques for light transmission, such as linearly aligning the devices through a transmission medium such as air, using optical steering devices such as mirrors, and employing optical fibers. To avoid optical losses in applications where intense illumination is desired, a simple alignment of the wave plate 204 with the plurality of glass plates 206 and transmission through air may be preferable. For some embodiments, the glass plates 206 may be uncoated glass plates. An uncoated glass plate may reflect about 4% of the light that is normally incident upon it at each surface. The decorrelator 104 may comprise between about 3 and 20 glass plates 206 disposed over a distance of approximately one meter (1 m) for some embodiments. In FIG. 2, seven glass plates 206 are depicted.

The spacing between two neighboring glass plates 206 may be different than the spacing between any other two neighboring glass plates 206 for many reasons, which are described below. To accomplish this varied spacing for some embodiments, the spacing between the glass plates 206 may be monotonically increased from a first end 210 to a second end 212 that is opposite the first end 210. FIG. 2 illustrates such embodiments where $d_3$ is greater than $d_2$, which is greater than $d_1$. For other embodiments, the spacing between the glass plates 206 may be monotonically decreased from the first end 210 to the second end 212, or the dissimilar spacing may be more random within the plurality of glass plates 206.

The plurality of glass plates 206 may be optically coupled to a reflecting device 208 to redirect the light transmitted from the glass plates 206 back through the plurality of glass plates 206 in step 306. The reflecting device 208 may comprise any suitable device for reflecting or redirecting light without significant optical loss, such as a mirror or a retroreflector. A retroreflector as used herein may be generally defined as a device that reflects light along a path parallel to the incident light wave regardless of the angle of incidence. Although only one reflecting device 208 is illustrated in FIG. 2, the reflecting device may comprise multiple reflecting devices, such as multiple mirrors, to redirect the light along the desired optical path.

Each of the glass plates 206 may reflect a portion of an incident light beam and transmit a remaining portion to the next plate 206 in the plurality. For example, an uncoated glass plate may reflect approximately 8% (4% per surface) of the incident light and transmit the remaining 92%. This phenomenon may occur in both the nominal transmission direction 214 of the light from the wave plate 204 to the reflecting device 208 and the nominal reflection direction 216 of the light from the reflecting device 208 back to the wave plate 204. By reflecting portions of light incident on the glass plates 206, light exiting the wave plate 204 may be divided into a plurality of component sub-beams, or sub-pulses, that are further transmitted and reflected by the glass plates 206. By varying the spacing between the glass plates 206, the component sub-beams may have different delays upon being continuously recombined and transmitted back to the wave plate 204, so that the composite pulse of energy leaving the decorrelator 104 may have an increased average pulse width and is less coherent, such as incoherent light beam 218. In this manner, the decorrelator 104 in FIG. 2 may address the temporal coherence of the incident light 200.

In order to be effective, the separation in time due to optical travel through the plurality of glass plates 206 should be on the order of a coherence length or more. As used herein, the coherence length may be generally defined as the propagation distance from a coherent light source to a point where the light wave maintains a specified degree of coherence. In optics, the coherence length L may be approximated by the formula:

$$L = \frac{\lambda^2}{n\Delta\lambda}$$

where $\lambda$ is the nominal wavelength of the source, n is the refractive index of the medium, and $\Delta\lambda$ is the spectral width of the source. Because the spectral width of a source is somewhat ambiguous, however, the coherence length has been defined as the optical path length difference of a self-interfering laser beam which corresponds to a 50% fringe visibility, where the fringe visibility V is defined as $$V = \frac{I_{max} - I_{min}}{I_{max} + I_{min}}$$

where I is the fringe intensity.

Spatial decorrelation may be accomplished by an imperfect overlay of the component sub beams. In other words, the plurality of glass plates 206 may not be perfectly aligned in an effort to cause displacements, deviations in transmission angles of the component sub beams, or both. The separation in space should be sufficient to displace the speckle pattern by at least a speckle dot width at the image plane. The speckle dot width at the image plane may be essentially the minimum resolvable spot for the laser processing system 100 and may be approximated for a laser light source as $$D = \frac{2\lambda_0}{n\pi NA}$$

where D is the diameter of the laser beam at its narrowest spot, $\lambda_0$ is the vacuum wavelength of the light, n is the refractive index of the medium, and NA is the numerical aperture. Thus, when air (n=1.0) is used as the transmission medium, the narrowest spot may be approximated by $D=0.6\lambda_0/NA$.

Once the light has been decorrelated in both time and space in the plurality of glass plates 206, the incoherent light 218 may be transmitted back through the wave plate 204 and have its polarization altered. For some embodiments where the wave plate 204 is a quarter wave plate and the incoherent light 218 is circularly polarized, the wave plate 204 may linearly polarize the incoherent light 218 in step 308 of FIG. 3, and the polarization of the linearly polarized incoherent light may be rotated 90° with respect to the polarization of the linearly polarized incident light 200. In such cases, if the incident light 200 is s-polarized, then the incoherent light beam 220 exiting the PBS 202 after being linearly polarized by the quarter wave plate may be p-polarized, or parallel to the plane of incidence, a plane made by the propagation direction of the light and a vector normal to a reflecting surface. P-polarization is also known as pi-polarization or tangential plane polarization. By controlling the polarization of the light through the decorrelator 104 in this manner, optical energy may be substantially preserved. In other words, switching between linear and circular polarization and back again may reduce optical losses in the decorrelator 104 when compared to decorrelation without polarization altering. Furthermore, by controlling the polarization, the wave plate 204 may enable a two-port decorrelator as illustrated in FIG. 2, where light enters in one port (or face of the PBS 202) and exits through a different port.

For some embodiments, the incoherent light beam 218 may be optically steered to exit the decorrelator 104 instead of passing back through the wave plate 204. In such embodiments, the incoherent light beam 218 may remain circularly polarized.

For embodiments where the incident light is p-polarized, all of the arrows in FIG. 2 may be reversed to show the main optical paths through the decorrelator 104. Thus, the p-polarized incident light may enter the PBS 202 from the side and be circularly polarized by a quarter wave plate, such as the wave plate 204. The plurality of glass plates 206 may divide the transmitted beam from the wave plate 204 into a plurality of sub-beams in both the nominal transmission and reflection directions 214, 216 (reversed from those depicted in FIG. 2 for this case). Upon passing back through the quarter wave plate, the circularly polarized incoherent sub-beams reaching the wave plate 204 may be transformed into a linearly polarized incoherent beam with s-polarization. The s-polarized incoherent beam may be reflected by the base 201 of one of the two triangular prisms of the PBS 202 and may exit the PBS 202 from the top in this case.

In one alternate embodiment, a plurality of glass plates 206 that are spaced a distance apart may be placed in the optical path of the light source 102, and the reflecting device 208 may not be used. In such cases, an incoherent light beam may exit the decorrelator 104 from the second end 212 of the plurality of glass plates 206. A second quarter wave plate (not shown) coupled to the second end 212 of the plurality of glass plates 206 may be employed in an effort to linearly polarize circularly polarized light received from the second end 212 such that the resulting incoherent light beam is linearly polarized. However, this alternate embodiment may waste a significant portion of the incident light energy since the reflecting device 208 is not used and hence, not all of the constituent sub-beams are eventually recombined.

While the foregoing is directed to embodiments of the present invention, other and further embodiments of the invention may be devised without departing from the basic scope thereof, and the scope thereof is determined by the claims that follow.

The invention claimed is:

1. An apparatus for decorrelating coherent light, comprising:
   a polarizing beam splitter configured to receive the coherent light;
   a wave plate directly coupled to the polarizing beam splitter;
   a plurality of optically coupled glass plates, wherein the plurality of glass plates are positioned linearly from a first end to a second end, each of the plurality of glass plates is positioned to reflect a portion of an incident light beam to a preceding glass plate and transmit a remaining portion of the incident light to a following glass plate, the glass plate at the first end is optically coupled to the wave plate, and spacing between two directly adjacent glass plates is different than spacing between any other two directly adjacent glass plates; and
   a retroreflector optically coupled to the glass plate positioned at the second end.

2. The apparatus of claim 1, wherein the polarizing beam splitter is configured to output incoherent light after light incident on the polarizing beam splitter is transmitted through the wave plate, reflected by and transmitted through each of the plurality of glass plates, reflected by the retroreflector, re-reflected by and retransmitted through each of the plurality of glass plates, and retransmitted through the wave plate.

3. The apparatus of claim 1, wherein the coherent light is s-polarized and the incoherent light is p-polarized.

4. The apparatus of claim 1, wherein the coherent light is linearly polarized and the wave plate is configured to circularly polarize the linearly polarized coherent light as the coherent light is transmitted from the polarizing beam splitter through the wave plate to the plurality of glass plates.

5. The apparatus of claim 1, wherein light transiting the plurality of glass plates is circularly polarized and the wave plate is configured to linearly polarize light received from the plurality of glass plates.

6. The apparatus of claim 1, wherein the plurality of glass plates is disposed with increased spacing from the first end to the second end.

7. The decorrelator of claim 1, wherein the plurality of glass plates is disposed with decreased spacing from the first end to the second end.

8. The decorrelator of claim 1, wherein the wave plate is optically coupled to the glass plate at the first end by linearly aligning the wave plate and the plurality of glass plates through a transmission medium such as air.

9. The decorrelator of claim 1, wherein the plurality of glass plates is disposed over a distance of about 1 meter.

10. The decorrelator of claim 9, wherein the plurality of glass plates comprises between about 3 to about 20 glass plates.

11. The decorrelator of claim 1, wherein the plurality of glass plates is aligned to cause displacements and/or deviations in transmission angles.

12. The decorrelator of claim 1, wherein the plurality of glass plates are uncoated.

13. A pulsed laser system comprising:
a decorrelator comprising:
a polarizing beam splitter configured to receive the coherent light;
a wave plate directly coupled to the polarizing beam splitter;
a plurality of optically coupled glass plates, wherein the plurality of glass plates are positioned linearly from a first end to a second end, each of the plurality of glass plates is positioned to reflect a portion of an incident light beam to a preceding glass plate and transmit a remaining portion of the incident light to a following glass plate, the glass plate at the first end is optically coupled to the wave plate, and spacing between two directly adjacent glass plates is different than spacing between any other two directly adjacent glass plates; and
a retroreflector optically coupled to the glass plate positioned at the second end.

14. A laser processing system, comprising:
a laser source for providing coherent light; and
a decorrelator coupled to the laser source, the decorrelator comprising:
a polarizing beam splitter configured to receive the coherent light;
a wave plate directly coupled to the polarizing beam splitter;
a plurality of optically coupled glass plates, wherein the plurality of glass plates are positioned linearly from a first end to a second end, each of the plurality of glass plates is positioned to reflect a portion of an incident light beam to a preceding glass plate and transmit a remaining portion of the incident light beam to a following glass plate, the glass plate at the first end is optically coupled to the wave plate, and spacing between two directly adjacent glass plates is different than spacing between any other two directly adjacent glass plates; and
a retroreflector optically coupled to the glass plate positioned at the second end.

15. The laser processing system of claim 14, wherein the plurality of glass plates is disposed with increased spacing from the first end to the second end.

16. The laser processing system of claim 14, wherein the plurality of glass plates is disposed with decreased spacing from the first end to the second end.

17. The laser processing system of claim 14, wherein the plurality of glass plates are uncoated.

18. The laser processing system of claim 14, wherein the plurality of glass plates is disposed over a distance of about 1 meter.

19. The laser processing system of claim 18, wherein the plurality of glass plates comprises between about 3 to about 20 glass plates.

20. The laser processing system of claim 14, wherein the plurality of glass plates is aligned to cause displacements and/or deviations in transmission angles.

* * * * *